US012361620B2

(12) United States Patent
Legatski

(10) Patent No.: US 12,361,620 B2
(45) Date of Patent: Jul. 15, 2025

(54) VISUAL ASSET DISPLAY AND CONTROLLED MOVEMENT IN A VIDEO COMMUNICATION SESSION

(71) Applicant: Zoom Video Communications, Inc., San Jose, CA (US)

(72) Inventor: Richard Dean Legatski, Castle Rock, CO (US)

(73) Assignee: Zoom Communications, Inc., San Jose, CA (US)

( * ) Notice: Subject to any disclaimer, the term of this patent is extended or adjusted under 35 U.S.C. 154(b) by 131 days.

(21) Appl. No.: 18/124,860

(22) Filed: Mar. 22, 2023

(65) Prior Publication Data
US 2024/0320890 A1    Sep. 26, 2024

(51) Int. Cl.
*G06T 13/00* (2011.01)
*G06T 3/40* (2024.01)
*G06T 7/55* (2017.01)

(52) U.S. Cl.
CPC ........... *G06T 13/00* (2013.01); *G06T 3/40* (2013.01); *G06T 7/55* (2017.01); *G06T 2200/24* (2013.01); *G06T 2207/10016* (2013.01); *G06T 2207/20084* (2013.01)

(58) Field of Classification Search
None
See application file for complete search history.

(56) References Cited

U.S. PATENT DOCUMENTS

2021/0042950 A1* 2/2021 Wantland .............. G06T 19/006
2024/0127518 A1* 4/2024 Shao ....................... G06T 13/00

FOREIGN PATENT DOCUMENTS

CN          111225226 A * 6/2020    ......... H04N 21/2187

* cited by examiner

*Primary Examiner* — Jeffrey J Chow
(74) *Attorney, Agent, or Firm* — Young Basile Hanlon & MacFarlane, P.C.

(57) ABSTRACT

Methods, systems, and apparatus, including computer programs encoded on computer storage media related to visual asset display and controlled movement in a video communication session. The system provides for display, via a user interface, video of a meeting participant during a video communication session. A visual asset for display is selected. The visual asset is provided for display via the user interface. The visual asset is maneuvered along a path about the user interface such that the visual asset moves about the user interface during the video communication session.

20 Claims, 8 Drawing Sheets

VISUAL ASSET DISPLAY AND CONTROLLED MOVEMENT IN A VIDEO COMMUNICATION SESSION

CROSS-REFERENCE TO RELATED APPLICATIONS

None.

FIELD

This application relates generally to video-based communications, and more particularly, to systems and methods for visual asset display and controlled movement in a video communication session.

SUMMARY

The appended claims may serve as a summary of this application.

DETAILED DESCRIPTION OF THE DRAWINGS

Figure 1A:
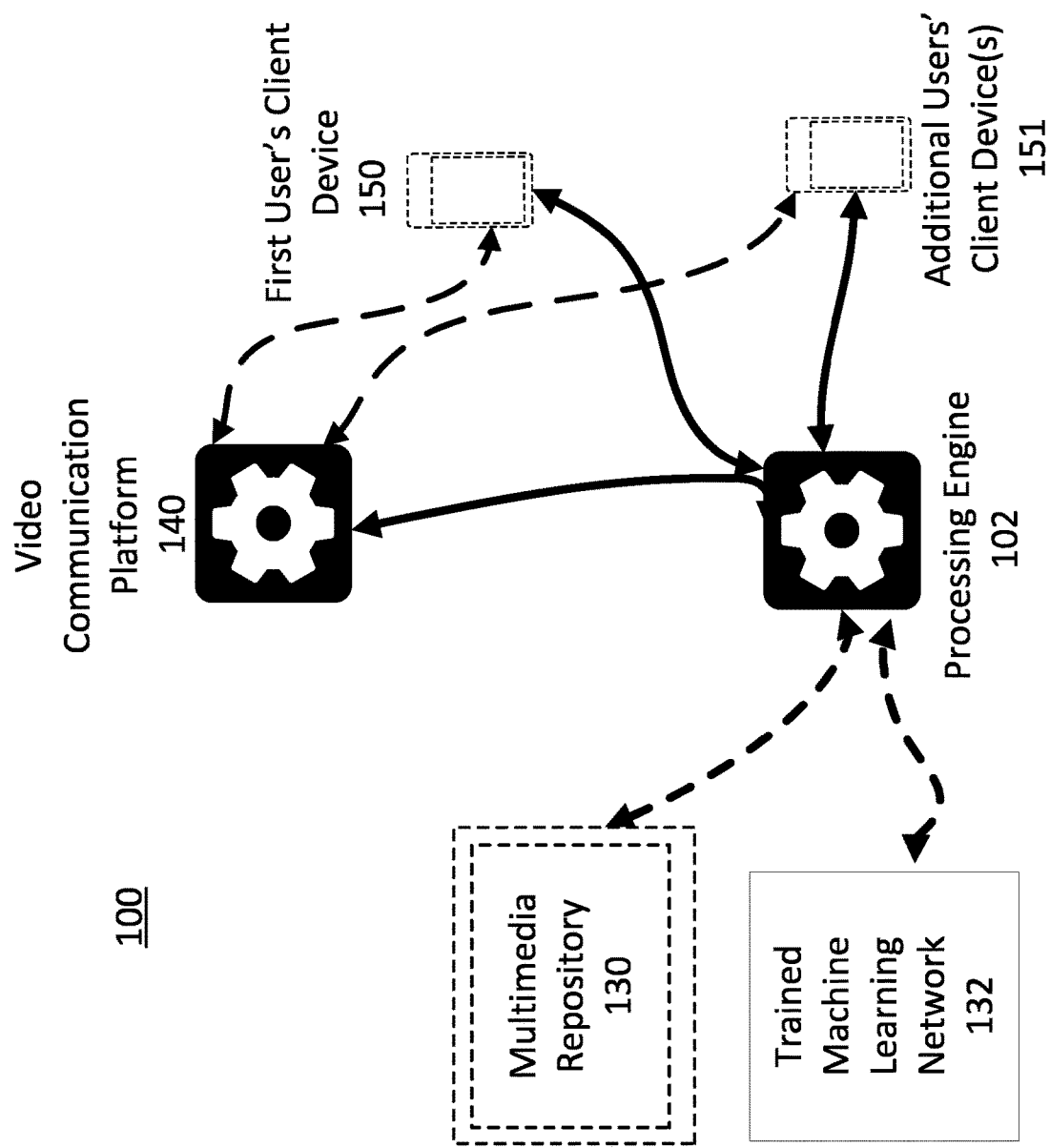
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a first user's client device 150 and one or more additional users' client device(s) 151 are connected to a processing engine 102 and, optionally, a video communication platform 140. The processing engine 102 is connected to the video communication platform 140, and optionally connected to one or more repositories (e.g., non-transitory data storage) and/or databases, including a Multimedia Repository 130. The Multimedia Repository 130 may include multimedia assets such as video file, image files (such as bitmap files and jpegs files), avatar models and other files that may be displayed according to the systems and methods described herein.

The first user's client device 150 and additional users' client device(s) 151 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the methods 500, 600 or other methods described herein and, as a result, provide for attendee management of repetitive video communication sessions for a group of users. In some embodiments, this may be accomplished via communication with the first user's client device 150, additional users' client device(s) 151, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein. A trained machine learning network 132 may be used to evaluate a user's background to determine an estimated depth value.

In some embodiments, the first user's client device 150 and additional users' client devices 151 may perform the methods 500, 600 or other methods described herein and, as a result, provide for attendee management of repetitive video communication sessions for a group of users. In some embodiments, this may be accomplished via communication with the first user's client device 150, additional users' client device(s) 151, processing engine 102, video communication platform 140, and/or other device(s) over a network between the device(s) and an application server or some other network server.

The first user's client device 150 and additional users' client device(s) 151 may be devices with a display configured to present information to a user of the device. In some embodiments, the first user's client device 150 and additional users' client device(s) 151 present information in the form of a user interface (UI) with UI elements or components. In some embodiments, the first user's client device 150 and additional users' client device(s) 151 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, video conference, webinar, or any other suitable video presentation) on a video communication platform. The additional users' client device(s) 151 may be configured to view the video presentation, and in some cases, presenting material and/or video as well. In some embodiments, first user's client device 150 and/or additional users' client device(s) 151 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 151 are computing devices capable of hosting and executing one or more applications or other programs capable of sending and/or receiving information. In some embodiments, the first user's client device 150 and/or additional users' client device(s) 151 may be a computer desktop or laptop, mobile phone, video phone, conferencing system, or any other suitable computing device capable of sending and receiving information. In some embodiments, the processing engine 102 and/or video communication platform 140 may be hosted in whole or in part as an application or web service executed on the first user's client device 150 and/or additional users' client device(s) 151. In some embodiments, one or more of the video communication platform 140, processing engine 102, and first user's client device 150 or additional users' client devices 151 may be the same device. In some embodiments, the first user's client device 150 is associated with a first user account on the video communication platform, and the additional users' client device(s) 151 are associated with additional user account(s) on the video communication platform. While described in the context of client devices performing some operations or functions of the system, a server or servers may perform some of the operation and functions as well.

Video communication platform 140 comprises a platform configured to facilitate video presentations and/or communication between two or more parties, such as within a video conference or virtual classroom. In some embodiments, video communication platform 140 enables video conference sessions between one or more users.

Figure 1B:
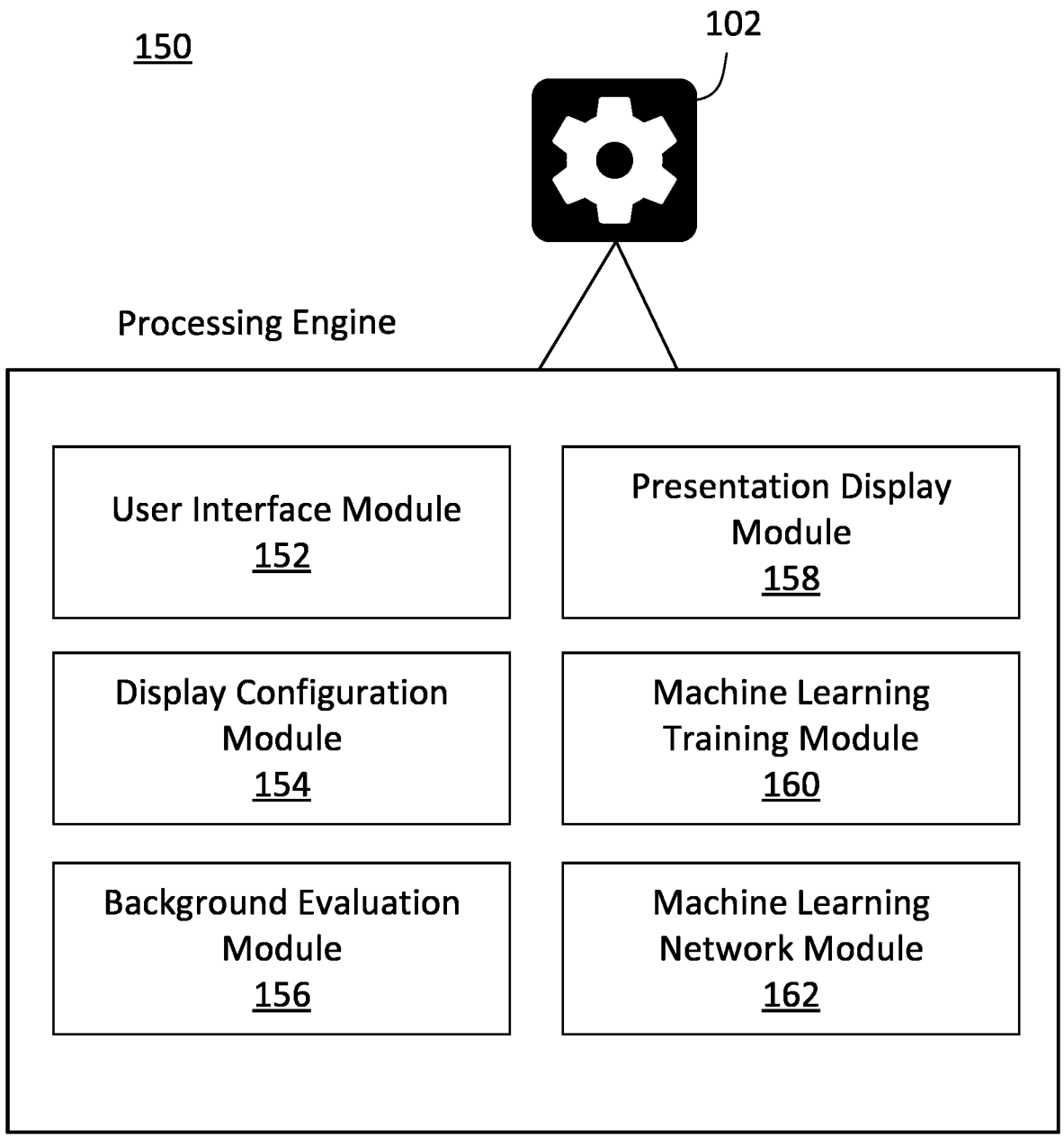
FIG. 1B is a diagram illustrating an exemplary computer system with software and/or hardware modules that may execute some of the functionality described herein.

FIG. 1B is a diagram illustrating an exemplary computer system 150 with software and/or hardware modules that may execute some of the functionality described herein. Computer system 150 may comprise, for example, a server or client device or a combination of server and client devices for multi-stream video communication among users attending a communications session.

The User Interface Module 152 provides system functionality for presenting a user interface to one or more users of the video communication platform 140 and receiving and processing user input from the users. User inputs received by the user interface herein may include clicks, keyboard inputs, touch inputs, taps, swipes, gestures, voice commands, activation of interface controls, and other user inputs. In some embodiments, the User Interface Module 152 presents a visual user interface on a display screen. In some embodiments, the user interface may comprise audio user interfaces such as sound-based interfaces and voice commands.

The Display Configuration Module 154 provides system functionality configuring the display of multimedia assets via a user's interface. This module allows a user to select particular multimedia assets to be displayed during a video communication session with other users.

The Background Evaluation Module 156 provides system functionality for evaluating a user's background. This module may determine an estimated depth of the background to be used in the control and movement of a multimedia asset about a user interface.

The Presentation Display Module 158 provides system functionality for displaying or presenting multi-media presentation and/or screen sharing content that has video and/or animated graphics shared among the meeting participants. The Presentation Display Module 158 controls aspects presenting information to attendees of a video-based meeting.

The Machine Learning Training Module 160 provides system functionality for the training of a machine learning network based on an image datasets of different user backgrounds. The machine learning network may be trained to determine an estimated background depth of a user's background. The training of the machine learning network for example may be based on supervised learning where multiple images of user background with as associated depth value are used to train the machine learning model. The trained machine learning network 140 may then evaluate a user's background to determine an estimated background depth.

The Machine Learning Network Module 162 provides system functionality for using a trained machine learning network 132 to process obtained images of a user's background during the video communication session. Video images of a user's actual or virtual background may be processed by the trained machine learning network 132 to determine an estimate background depth.

Figure 2:
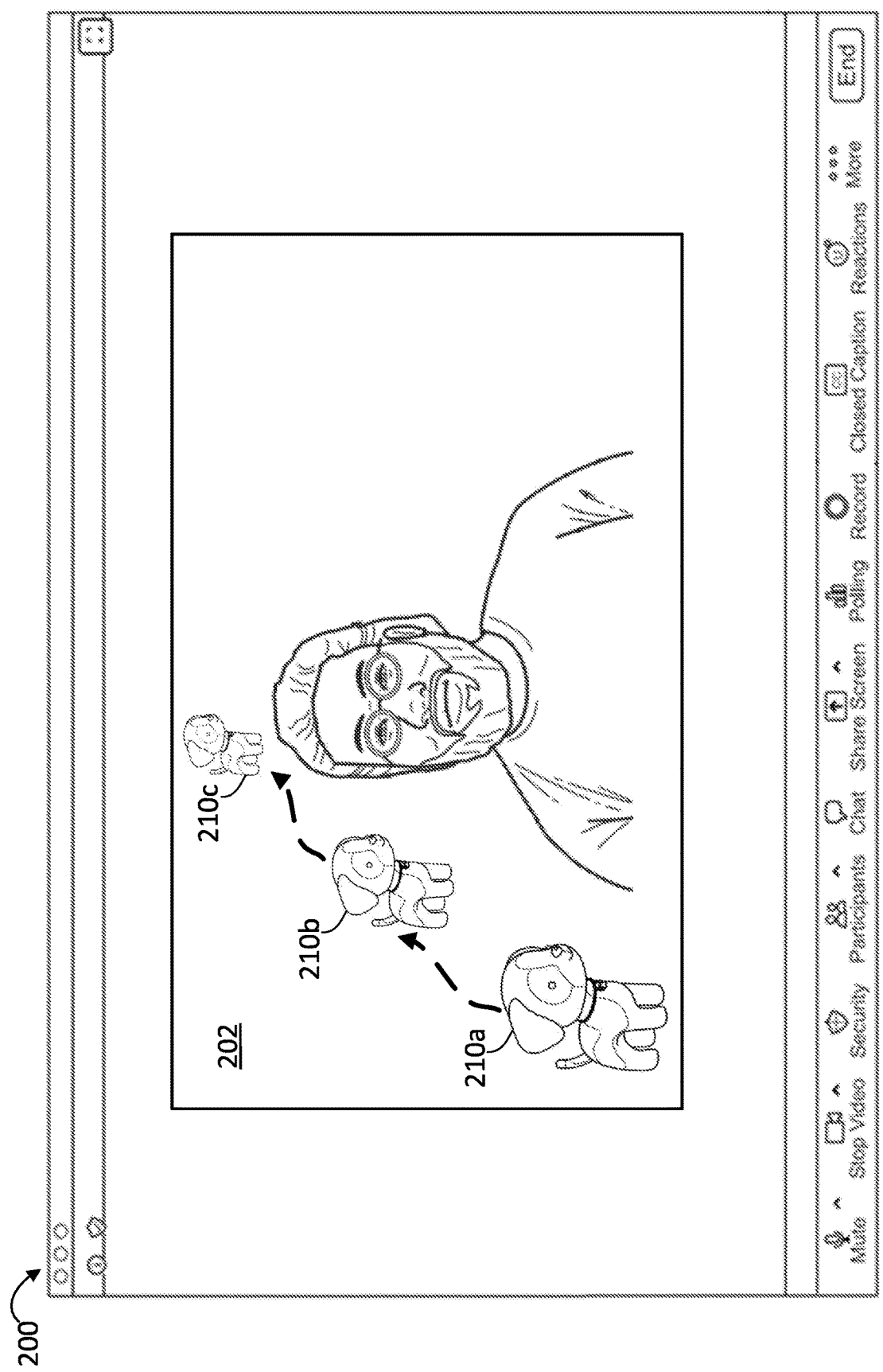
FIG. 2 is a diagram illustrating an exemplary user interface used in some embodiments.

FIG. 2 is a diagram illustrating an exemplary user interface 200 used in some embodiments. The system, via the User Interface Module 152, may generate and display the user interface 200. The depicted user interface 200 illustrates a meeting participant displayed in meeting display area 202. A visual asset is selected for display and is depicted in the display area 202. For example, a meeting participant may select an image or animated graphic to be displayed. During the course of a video communications session among meeting participants, the meeting participants may view the meeting participant along with the visual asset that was selected by a meeting participant. The visual asset maneuvers about the display area during the course of the meeting.

The system dynamically moves the visual asset 210 (210a, 210b, 210c) about the display area 202. The Background Evaluation Module 156 may evaluate a background depth and cause the visual asset to move into the background area by reducing the size of the visual asset 210 which cause the visual asset to appear to be moving into the background. The visual asset is shown moving along a path about the display area 202. Three different time periods are depicted with the visual asset 210a at time period 1, visual asset 201b at time period 2 and visual asset 210c at time period 3. The visual assets 210a, 210b and 210c are the same visual asset but depicted with different sizes. As described below, a background depth value may be determined by the system and may be used to reduce the size of the visual asset to a size relative to the background depth value.

In some embodiments, a meeting participant may provide an input the user interface, such as clicking on an area of the user interface 200 or clicking and dragging from one area to another area of the user interface. In response to the input to the user interface, the visual asset may be shown as moving to the clicked on area. Also, the visual asset may follow the path selected by the user such as clicking on multiple points among the display. In response, the visual asset would move along a path in the order of the multiple inputs to the display.

Figure 3:
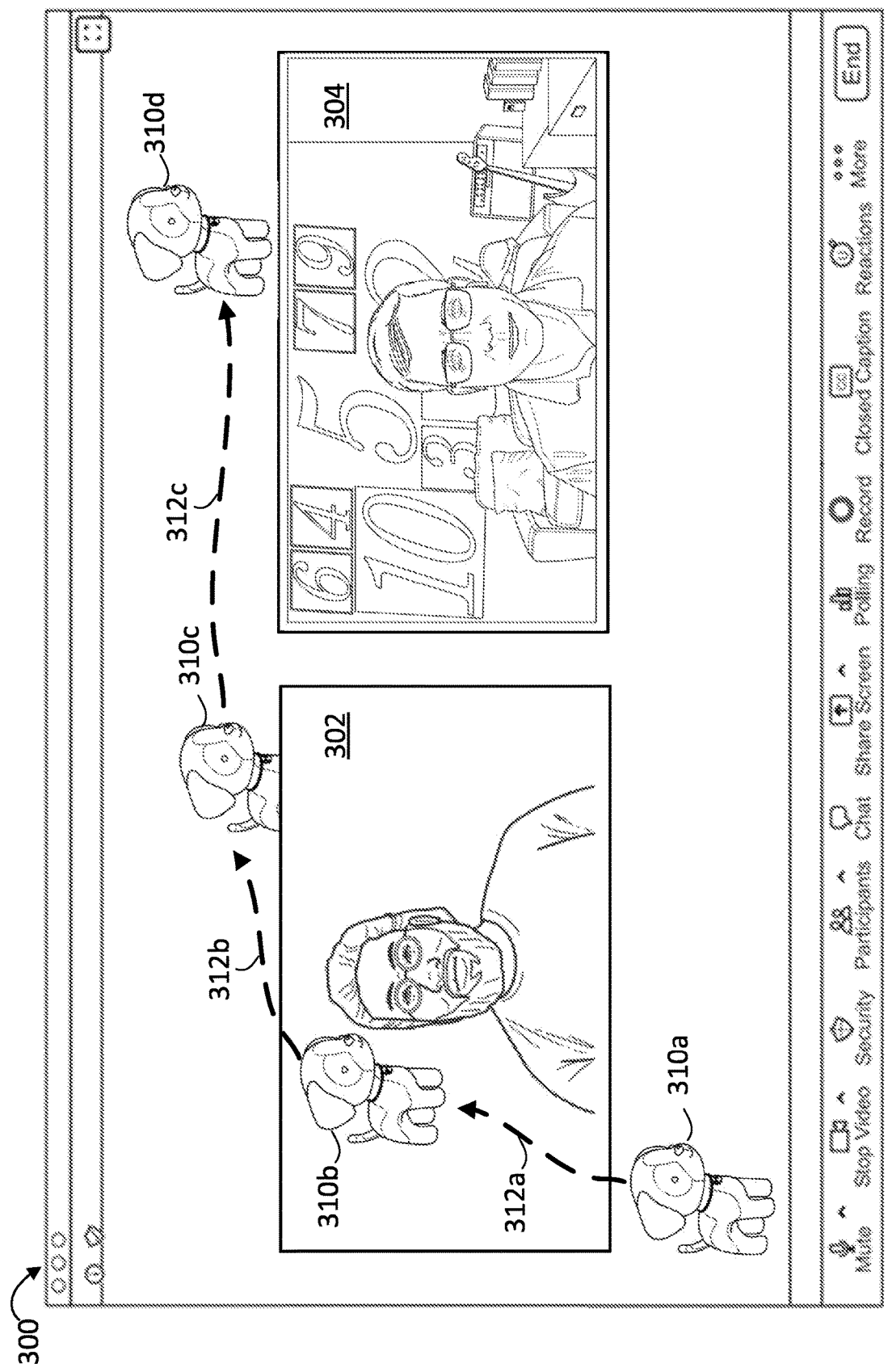
FIG. 3 is a diagram illustrating an exemplary user interface used in some embodiments.

FIG. 3 is a diagram illustrating an exemplary user interface 300 used in some embodiments. The system, via the User Interface Module 152, may generate and display the user interface 300. The depicted user interface 300 illustrates two meeting participants displayed in meeting display areas 302 and 304.

A visual asset 310 is selected for display and is depicted in a portion of the user interface 300. During the course of a video communications session, video of meeting participants may be displayed in respective display areas 302, 304. During a meeting, the visual asset (310a, 301b, 310c, 310c) follows along a path (312a, 312b, 312c). The visual asset 310 may be maneuver about the user interface 300. The visual assets 310a, 301b, 310c, 310c are the same visual asset, shown at different time periods. Visual asset 310a is depicted in a portion of the user interface 300. For example, a selected visual asset may appear in the lower left hand corner of the user interface 300. The visual asset 310a is shown as moving along a path 312a. The visual asset 310b is shown as positioned over the meeting display area 302. The visual asset 312 is then shown as moving along path 312b. Here the visual asset 312 moves back over to a portion of the user interface 300, and then the visual asset 310c is shown as moving behind the display area 302. The visual asset 310 then moves along the path 312c to a location in the user interface 300. The visual asset 310 is shown next as visual asset 310d.

In some embodiments, the system dynamically selects a visual asset for display based on the context of the meeting. For example, the meeting may have an associated meeting topic. Based on the meeting topic, the system may select a visual asset for display. For example, if meeting participants are meeting about a hobby, such as card crafting, a visual asset depicting a related visual asset may be selected and displayed. Moreover, the system may evaluate the context of a meeting dialogue and/or chat session and select a visual asset based on the determined context.

In some embodiments, multiple users each have a pre-selected or predetermined visual asset. During the course of the meeting, a first visual asset is displayed and maneuvers throughout the user interface. The first visual asset changes or morphs to a second visual asset that is associated with a pre-selected or predetermined visual asset of another user. During the course of the meeting, a change may be dynamically made to change the display visual asset corresponding to each of the pre-selected or predetermined visual assets.

In some embodiments, the system dynamically creates path of movement of the visual asset during the course of the video communications session. For example, the system may cause the visual asset to move along a random path or a preplanned path. In some embodiments, the system may create a path such that the visual asset maneuvers over each display area 302, 304 of depicted meeting participants.

In some embodiments, the system will dynamically adjust the course of movement of the visual asset based on an active speaker. The system may evaluate audio signals and/or video imagery of the meeting participants. The system may determine that one of the meeting participants is an active speaker. In response to determining that one of the meeting participants is an active speaker, the system will adjust the course of the movement of the visual asset such that the visual asset begins moving toward the active speaker.

In some embodiments, the system will dynamically adjust the course of movement of the visual asset based on a non-active speaker. The system may evaluate audio signals and/or video imagery of the meeting participants. The system may determine one or more of the meeting participants is a non-active speaker. For example, the system may track the activity of each of the meeting participants and assign an activity time value for a meeting participant. During the course of the meeting, the system evaluates the time value, and for the meeting participant with the lowest activity time value, the system may direct movement of the visual asset to that meeting participant. Moving the visual asset to the non-active speaker, may cause the meeting participant to participate more due to noticing the visual asset has moved in proximity in the user interface to their display position. In response to determining that one of the meeting participants is a non-active speaker, the system will adjust the course of the movement of the visual asset such that the visual asset begins moving toward to the determined non-active speaker.

Figure 4:
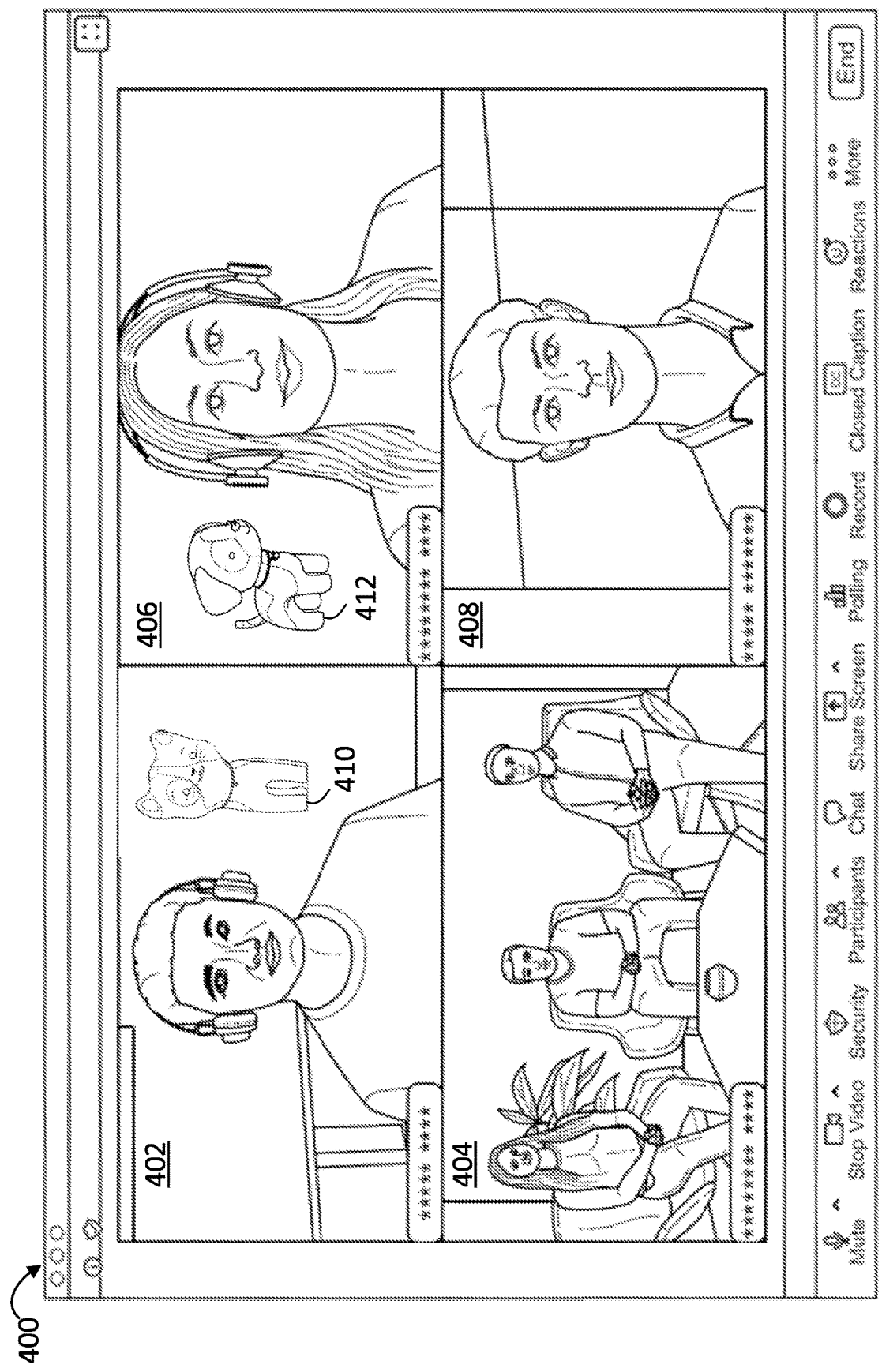
FIG. 4 is a diagram illustrating an exemplary user interface used in some embodiments.

FIG. 4 is a diagram illustrating an exemplary user interface 400 used in some embodiments. The system, via the User Interface Module 152, may generate and display the user interface 400. During the course of a video communications session, video of meeting participants may be displayed in respective display areas 402, 404, 406, 408.

In some embodiments, a user may select or have a pre-selected visual asset to be displayed with their video feed to other meeting participants. For example, the meeting participant in the display area 402 may have a preselected cat animation 410 that is overlayed on the meeting participant's video feed to other users. The meeting participant in the display area 406 may have selected a dog animation 412 that is overlayed on the meeting participant's video feed to other users. During the course of the meeting, any of the other meeting participants displaying the video feed of the user would see the user along with their selected visual asset.

Figure 5:
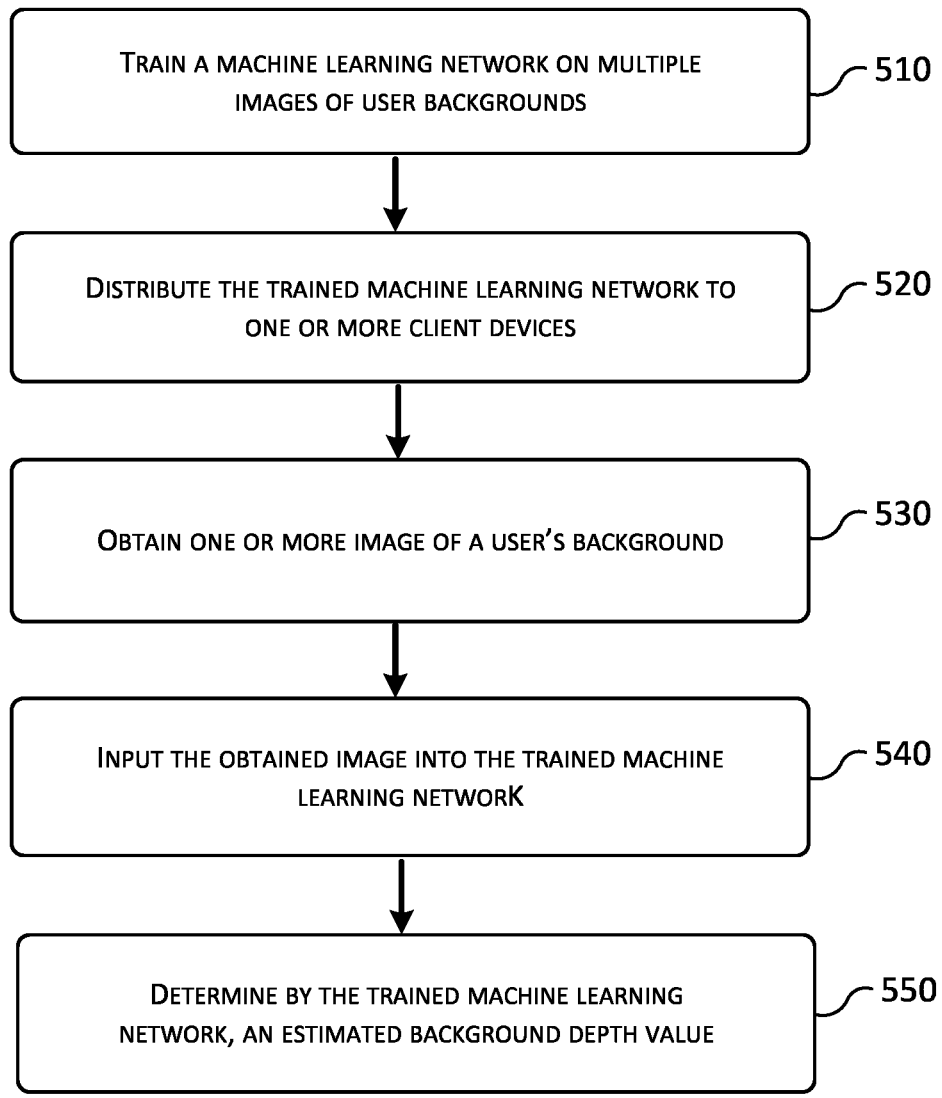
FIG. 5 is a flow chart illustrating an exemplary method that may be performed in some embodiments.

FIG. 5 is a flow chart illustrating an exemplary method 500 that may be performed in some embodiments. The system may train a machine learning model and/or machine learning network. In step 510, a machine learning network or model may be trained using a dataset of multiple images of user backgrounds. In some embodiments, the machine learning network may be a neural network, convolutional neural network, deep neural network or other suitable types of machine learning networks. In some embodiments, training samples of images comprise input and output pairs for supervised learning, wherein the input may comprise one or more images of different types of user backgrounds (such as images from video and/or virtual backgrounds).

In step 520, the trained machine learning network 132 may be distributed to one or more client devices, where the client devices may use the trained machine learning network to input one or more images of the user's video with their real background or a virtual background being displayed. In some embodiments, the trained machine learning network is stored on a server and the one or more client device may access the trained machine learning network from the server.

In step 530, one or more images of the user's video with their real background or a virtual background being displayed is obtained by a client device. For example, images of real-time video of a user during a video communication session may be obtained.

In step 540, the obtained one or more images of the user's video with their real background or a virtual background being displayed is input in the trained machine learning network. The system may perform processing on the image such as object detection to identify different possible aspects of the image, such as the portion of an image that displays a person, objects in a room (such as furniture), walls and other structures. The system may extract pixel groups of the identified objects and separately input the pixel groups into the trained machine learning network 132.

In step 550, the trained machine learning network 132 may determine or classify each of the objects identified in in an input image, or the separate pixel groups. The trained machine learning network may determine a background depth value for the image. For example, the system may evaluate an image of the video stream of a user working in an office space with a wall behind the user. The system may determine that the background depth value, for example, is 15 feet. In another example, the system may evaluate an image of a user working in a large open area and determine a background depth value, for example 50 feet. As described below, the background depth value may be used by the system to size a visual asset to project the image moving in a z-direction in a user's display. The system may increase or decrease the image based on the background depth value to create the appearance of the visual asset moving into the user's background.

Figure 6:
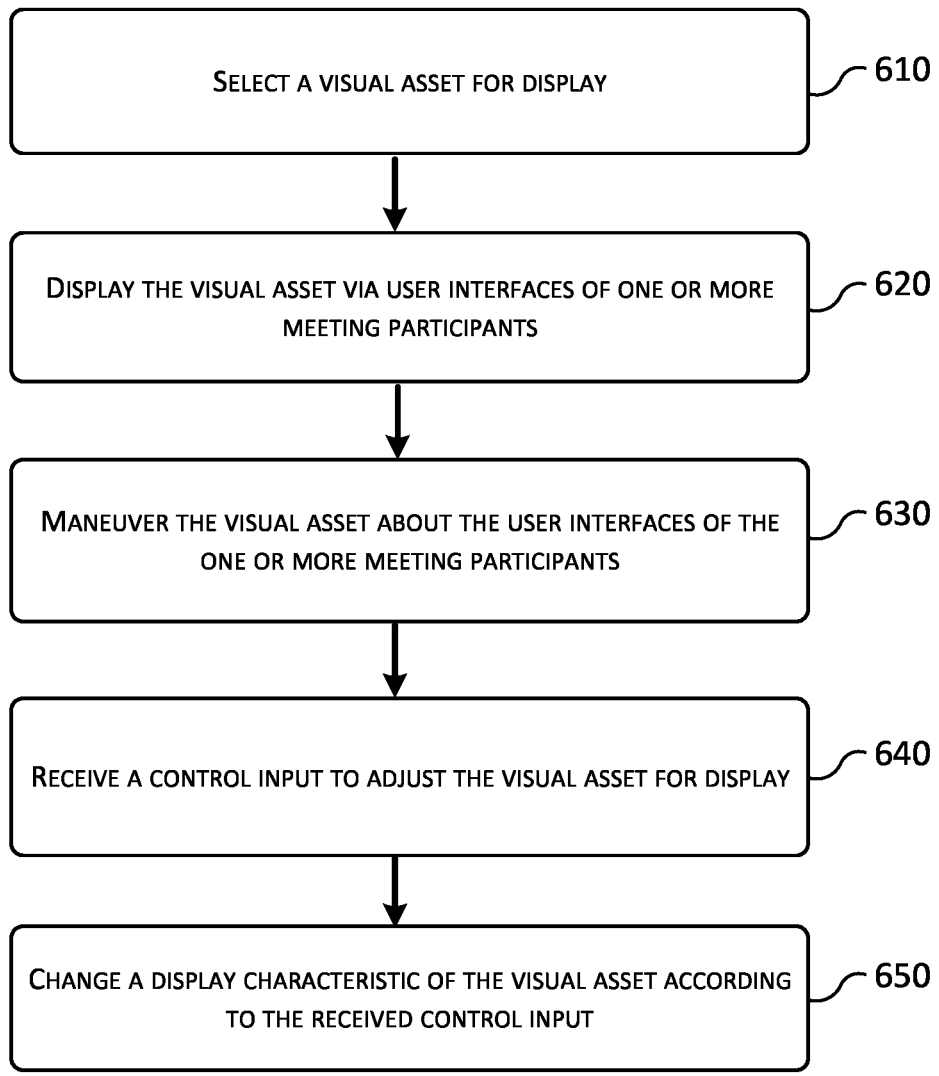
FIG. 6 is a flow chart illustrating an exemplary method that may be performed in some embodiments.
Figure 7:
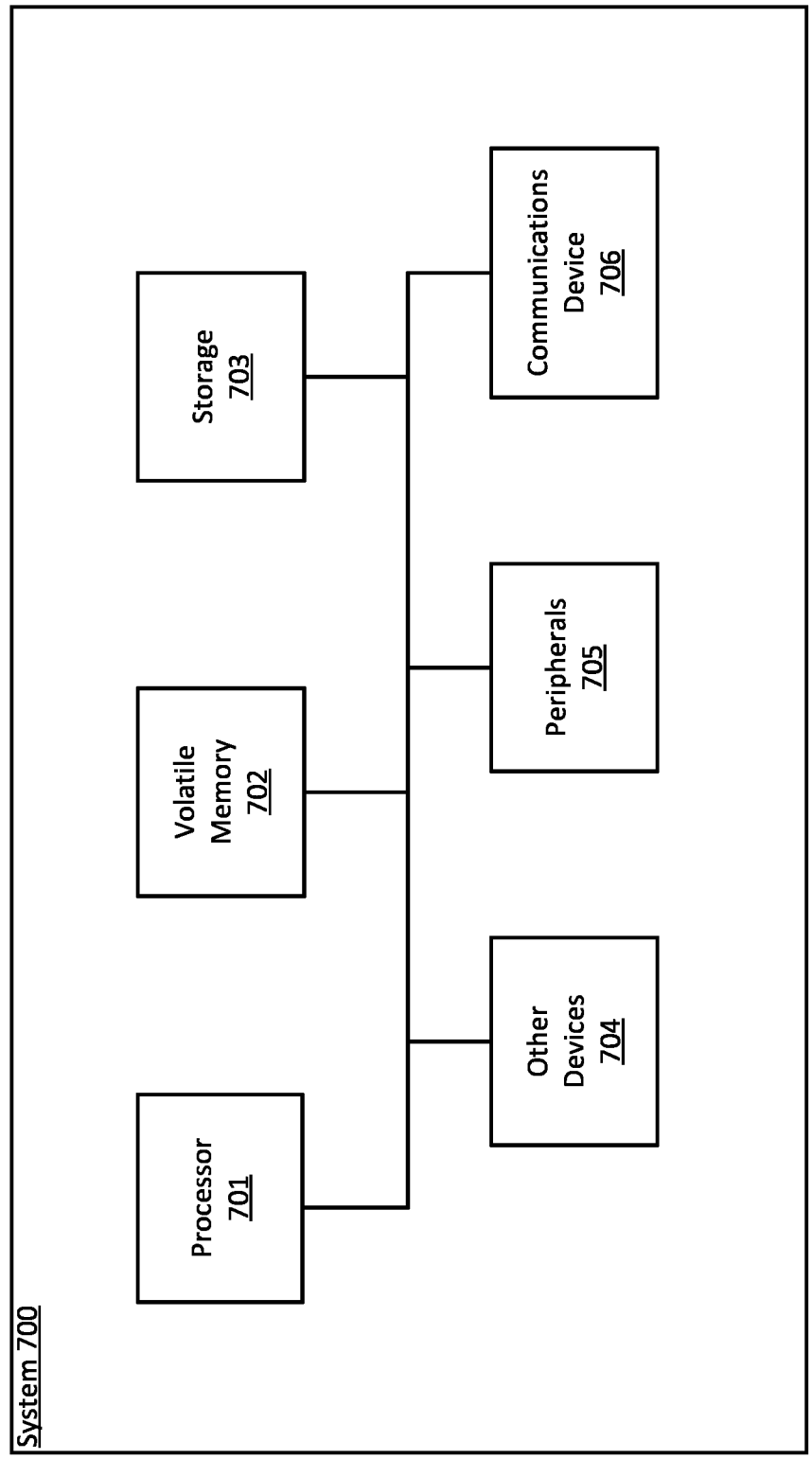
FIG. 7 is a diagram illustrating an exemplary computer that may perform processing in some embodiments.

FIG. 6 is a flow chart illustrating an exemplary method 600 that may be performed in some embodiments. The method illustrates the selection of a visual asset for display and the maneuvering of the visual asset during a communication session among meeting participants.

In step 610, a visual asset for display is selected. A user interface may receive a selection of a visual asset to be presented during a video communications session. For example, the user may select from a MultiMedia Repository 130 an image, video, animation, avatar, etc. to be presented during the video communications session.

In step 620, the visual asset is displayed via user interface of one or more meeting participants. A video feed of each of the one or more meeting participants may be displayed in a display area of a user interface. The video feed may show actual video of a meeting participant or show an animated avatar of the meeting participant. The selected visual asset is then depicted on respective user interfaces for the one or more meeting participants.

In step 630, the visual asset is maneuvered about the user interfaces of the one or more meeting participants. The visual asset is depicted as moving around and about the user interface. In some modes of operation, the system may dynamically create a path of movement of the visual asset during the course of the video communications session. For example, the system may cause the visual asset to move along a random path or a preplanned path. In some embodiments, the system may create a path such that the visual asset maneuvers over each display area of depicted meeting participants.

In some embodiments, the system may use an estimated background depth to generate a path of movement of the visual asset. The system may evaluate a background of a video feed of a meeting participant and input one or more images of the video feed into a trained machine learning network. The system may determine an estimated depth value of the background in the video feed.

Based on the estimated depth value of the background, the system may create a path maneuvering the visual asset in a display area depicting the meeting participant, such that the first asset reduces in size along the path of movement. This would cause the visual asset to appear to be moving into the background. The visual asset then may move along the path and increase in size to cause the visual asset to appear to be moving out of the background.

In step 640, the system may receive a control input via user interface which adjust the visual asset for display. For example, a user interface may receive an input from a meeting participant, such as selecting multiple points about the user interface.

The system may receive other inputs and change a display characteristic of the visual asset according to the received control input. For example, a user interface may display a control panel to adjust characteristics of the visual asset, such as the size, shape, color, etc.

In step 650, the system may change a display character of the visual asset according to the received control input. In response to the received control inputs, the system would cause the visual asset to move to each of the points in the order the inputs were made.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

It will be appreciated that the present disclosure may include any one and up to all of the following examples.

Example 1: A computer-implemented method comprising: providing for display, via a user interface, video of a meeting participant during a video communication session; selecting a first visual asset for display; providing for display the first visual asset via the user interface; and maneuvering the first visual asset along a path about the user interface such that the first visual asset moves about the user interface during the video communication session.

Example 2: The computer-implemented method of Example 1, further comprising: receiving a control input to adjust the first visual asset for display; and changing a display characteristic of the first visual asset according to the received control input.

Example 3: The computer-implemented method of any one of Examples 1-2, further comprising: inputting one or more images of the video into a trained machine learning network; and determining and estimated depth value of a background in the video.

Example 4: The computer-implemented method of any one of Examples 1-3, further comprising: based on the estimated depth value of the background maneuvering the first visual asset in a display area depicting the meeting participant such that the first visual asset reduces in size to cause the first visual asset to appear to be moving into the background.

Example 5: The computer-implemented method of any one of Examples 1-4, wherein the first visual asset maneuvers over and behind a display area of the meeting participant.

Example 6: The computer-implemented method of any one of Examples 1-5, further comprising: receiving a selection of a second visual asset; and providing for display the first visual asset via the user interface.

Example 7: The computer-implemented method of any one of Examples 1-6, wherein the first visual asset is any one of an image, a video, an animation or animated graphic.

Example 8: The computer-implemented method of any one of Examples 1-7, wherein the visual asset is automatically selected based on a context of a meeting.

Example 9: The computer-implemented method of any one of Examples 1-8, wherein the context of a meeting is based on an evaluated dialogue of meeting participants.

Example 10: The computer-implemented method of any one of Examples 1-9, wherein the context of a meeting is based on information of a planned meeting scheduled in a calendar application.

Example 11: The computer-implemented method of any one of Examples 1-10, wherein the visual asset automatically changes over the course of a meeting based on a preselected visual asset of multiple users.

Example 12: The computer-implemented method of any one of Examples 1-11, further comprising: determining a non-active speaker of the meeting participants, wherein the visual asset moves toward the determined non-active speaker.

Example 13: The computer-implemented method of any one of Examples 1-12, wherein the path is a system generated predetermined path.

Example 14: The computer-implemented method of any one of Examples 1-13, wherein the path is a user generated path based on one or more inputs to the user interface.

Example 15: The computer-implemented method of any one of Examples 1-14, further comprising: determine an active speaker of the meeting participants.

Example 16: The computer-implemented method of any one of Examples 1-15, wherein the visual asset moves toward the determined active speaker.

Example 15: The computer-implemented method of any one of Examples 1-14, further comprising: determine an active speaker of the meeting participants.

Example 16: The computer-implemented method of any one of Examples 1-15, wherein the visual asset moves toward the determined active speaker.

Example 17: The computer-implemented method of any one of Examples 1-16, further comprising: providing for display a control panel; receiving an input to the control panel; in response to receiving the input the control panel, changing a visual characteristic of the first visual asset, wherein the visual characteristic is any one of a size of the first visual asset, a shape of the first visual asset and/or a color of the first visual asset.

Example 18: A non-transitory computer readable medium that stores executable program instructions that when executed by one or more computing devices configure the one or more computing devices to perform operations comprising: providing for display, via a user interface, video of a meeting participant during a video communication session; selecting a first visual asset for display; providing for display the first visual asset via the user interface; and maneuvering the first visual asset along a path about the user interface such that the first visual asset moves about the user interface during the video communication session.

Example 19: The non-transitory computer readable medium of Example 18, further comprising the operations of: receiving a control input to adjust the first visual asset for display; and changing a display characteristic of the first visual asset according to the received control input.

Example 20: The non-transitory computer readable medium of any one of Examples 18-19, further comprising the operations of: inputting one or more images of the video into a trained machine learning network; and determining and estimated depth value of a background in the video.

Example 21: The non-transitory computer readable medium of any one of Examples 18-20, further comprising the operations of: based on the estimated depth value of the background maneuvering the first visual asset in a display area depicting the meeting participant such that the first visual asset reduces in size to cause the first visual asset to appear to be moving into the background.

Example 22: The non-transitory computer readable medium of any one of Examples 18-21, wherein the first visual asset maneuvers over and behind a display area of the meeting participant.

Example 23: The non-transitory computer readable medium of any one of Examples 18-22, further comprising the operations of: receiving a selection of a second visual asset; and providing for display the first visual asset via the user interface.

Example 24: The non-transitory computer readable medium of any one of Examples 18-23, wherein the first visual asset is any one of an image, a video, an animation or animated graphic.

Example 25: The non-transitory computer readable medium of any one of Examples 18-24, wherein the visual asset is automatically selected based on a context of a meeting.

Example 26: The non-transitory computer readable medium of any one of Examples 18-25, wherein the context of a meeting is based on an evaluated dialogue of meeting participants.

Example 27: The non-transitory computer readable medium of any one of Examples 18-26, wherein the context of a meeting is based on information of a planned meeting scheduled in a calendar application.

Example 28: The non-transitory computer readable medium of any one of Examples 18-27, wherein the visual asset automatically changes over the course of a meeting based on a preselected visual asset of multiple users.

Example 29: The non-transitory computer readable medium of any one of Examples 18-28, further comprising: determining a non-active speaker of the meeting participants, wherein the visual asset moves toward the determined non-active speaker.

Example 30: The non-transitory computer readable medium of any one of Examples 18-29, wherein the path is a system generated predetermined path.

Example 31: The non-transitory computer readable medium of any one of Examples 18-30, wherein the path is a user generated path based on one or more inputs to the user interface.

Example 32: The non-transitory computer readable medium of any one of Examples 18-31, further comprising: determine an active speaker of the meeting participants.

Example 33: The non-transitory computer readable medium of any one of Examples 18-32, wherein the visual asset moves toward the determined active speaker.

Example 34: The non-transitory computer readable medium of any one of Examples 18-33, further comprising: providing for display a control panel; receiving an input to the control panel; in response to receiving the input the control panel, changing a visual characteristic of the first visual asset, wherein the visual characteristic is any one of a size of the first visual asset, a shape of the first visual asset and/or a color of the first visual asset.

Example 35: A system comprising one or more processors configured to perform the operations of: providing for display, via a user interface, video of a meeting participant during a video communication session; selecting a first visual asset for display; providing for display the first visual asset via the user interface; and maneuvering the first visual asset along a path about the user interface such that the first visual asset moves about the user interface during the video communication session.

Example 36: The system of Example 35, further comprising the operations of: receiving a control input to adjust the first visual asset for display; and changing a display characteristic of the first visual asset according to the received control input.

Example 37: The system of any one of Examples 35-36, further comprising the operations of: inputting one or more images of the video into a trained machine learning network; and determining and estimated depth value of a background in the video.

Example 38: The system of any one of Examples 35-37, further comprising the operations of: based on the estimated depth value of the background maneuvering the first visual asset in a display area depicting the meeting participant such that the first visual asset reduces in size to cause the first visual asset to appear to be moving into the background.

Example 39: The system of any one of Examples 35-38, wherein the first visual asset maneuvers over and behind a display area of the meeting participant.

Example 40: The system of any one of Examples 35-39, further comprising the operations of: receiving a selection of a second visual asset; and providing for display the first visual asset via the user interface.

Example 41: The system of any one of Examples 35-40, wherein the first visual asset is any one of an image, a video, an animation or animated graphic.

Example 42: The system of any one of Examples 35-41, wherein the visual asset is automatically selected based on a context of a meeting.

Example 43: The system of any one of Examples 35-42, wherein the context of a meeting is based on an evaluated dialogue of meeting participants.

Example 44: The system of any one of Examples 35-43, wherein the context of a meeting is based on information of a planned meeting scheduled in a calendar application.

Example 45: The system of any one of Examples 35-44, wherein the visual asset automatically changes over the course of a meeting based on a preselected visual asset of multiple users.

Example 46: The system of any one of Examples 35-45, further comprising: determining a non-active speaker of the meeting participants, wherein the visual asset moves toward the determined non-active speaker.

Example 47: The system of any one of Examples 35-46, wherein the path is a system generated predetermined path.

Example 48: The system of any one of Examples 35-47, wherein the path is a user generated path based on one or more inputs to the user interface.

Example 49: The system of any one of Examples 35-48, further comprising: determine an active speaker of the meeting participants.

Example 50: The system of any one of Examples 35-49, wherein the visual asset mov6es toward the determined active speaker.

Example 51: The system of any one of Examples 35-50, further comprising: providing for display a control panel; receiving an input to the control panel; in response to receiving the input the control panel, changing a visual characteristic of the first visual asset, wherein the visual characteristic is any one of a size of the first visual asset, a shape of the first visual asset and/or a color of the first visual asset.

Some portions of the preceding detailed descriptions have been presented in terms of algorithms, equations and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:
   providing for display, via a user interface, video of a meeting participant during a video communication session;
   determining an estimated depth value of a background in the video using a machine learning network that is trained on background images, wherein each background image of the background images has an associated depth value;
   selecting a first visual asset for display;
   providing for display the first visual asset via the user interface; and
   maneuvering the first visual asset along a path about the user interface such that the first visual asset moves about the user interface during the video communication session.

2. The computer-implemented method of claim 1, further comprising:
   receiving a control input to adjust the first visual asset for display; and
   changing a display characteristic of the first visual asset according to the received control input.

3. The computer-implemented method of claim 1, further comprising:
   inputting the background images of the video into the machine learning network.

4. The computer-implemented method of claim 1, further comprising:
   based on the estimated depth value of the background, maneuvering the first visual asset in a display area depicting the meeting participant such that the first visual asset reduces in size to cause the first visual asset to appear to be moving into the background.

5. The computer-implemented method of claim 1, wherein the first visual asset maneuvers over and behind a display area of the meeting participant.

6. The computer-implemented method of claim 1, further comprising:
   receiving a selection of a second visual asset; and
   providing for display the first visual asset via the user interface.

7. The computer-implemented method of claim 1, wherein the first visual asset is any one of an image, a video, an animation or animated graphic.

8. A non-transitory computer readable medium that stores executable program instructions that when executed by one or more computing devices configure the one or more computing devices to perform operations comprising:
   providing for display, via a user interface, video of a meeting participant during a video communication session;
   determining an estimated depth value of a background in the video using a machine learning network that is trained on background images, wherein each background image of the background images has an associated depth value;
   selecting a first visual asset for display;
   providing for display the first visual asset via the user interface; and
   maneuvering the first visual asset along a path about the user interface such that the first visual asset moves about the user interface during the video communication session.

9. The non-transitory computer readable medium of claim 8, further comprising the operations of:
   receiving a control input to adjust the first visual asset for display; and
   changing a display characteristic of the first visual asset according to the received control input.

10. The non-transitory computer readable medium of claim 8, further comprising the operations of:
    inputting the background images of the video into the machine learning network.

11. The non-transitory computer readable medium of claim 8, further comprising the operations of:
    based on the estimated depth value of the background, maneuvering the first visual asset in a display area depicting the meeting participant such that the first visual asset reduces in size to cause the first visual asset to appear to be moving into the background.

12. The non-transitory computer readable medium of claim 8, wherein the first visual asset maneuvers over and behind a display area of the meeting participant.

13. The non-transitory computer readable medium of claim 8, further comprising the operations of:
    receiving a selection of a second visual asset; and
    providing for display the first visual asset via the user interface.

14. The non-transitory computer readable medium of claim 8, wherein the first visual asset is any one of an image, a video, an animation or animated graphic.

15. A system, comprising:
    one or more processors configured to:
    provide for display, via a user interface, video of a meeting participant during a video communication session;

determine an estimated depth value of a background in the video using a machine learning network that is trained on background images, wherein each background image of the background images has an associated depth value;

select a first visual asset for display;

provide for display the first visual asset via the user interface; and maneuver the first visual asset along a path about the user interface such that the first visual asset moves about the user interface during the video communication session.

16. The system of claim 15, wherein the one or more processors are further configured to:

receive a control input to adjust the first visual asset for display; and change a display characteristic of the first visual asset according to the received control input.

17. The system of claim 15, wherein the one or more processors are further configured to:

input the background images of the video into the machine learning network.

18. The system of claim 15, wherein the one or more processors are further configured to:

based on the estimated depth value of the background, maneuvering the first visual asset in a display area depicting the meeting participant such that the first visual asset reduces in size to cause the first visual asset to appear to be moving into the background.

19. The system of claim 15, wherein the first visual asset maneuvers over and behind a display area of the meeting participant.

20. The system of claim 15, wherein the one or more processors are further configured to:

receive a selection of a second visual asset; and provide for display the first visual asset via the user interface.

* * * * *

UNITED STATES PATENT AND TRADEMARK OFFICE
CERTIFICATE OF CORRECTION

| | | |
|---|---|---|
| PATENT NO. | : 12,361,620 B2 | Page 1 of 1 |
| APPLICATION NO. | : 18/124860 | |
| DATED | : July 15, 2025 | |
| INVENTOR(S) | : Richard Dean Legatski | |

It is certified that error appears in the above-identified patent and that said Letters Patent is hereby corrected as shown below:

On the Title Page

Item (71) Applicant: Zoom Video Communications, Inc., San Jose, CA (US)
Should be:
Item (71) Applicant: Zoom Communications, Inc., San Jose, CA (US)

Signed and Sealed this
Fourteenth Day of October, 2025

John A. Squires
*Director of the United States Patent and Trademark Office*